Figure 1:
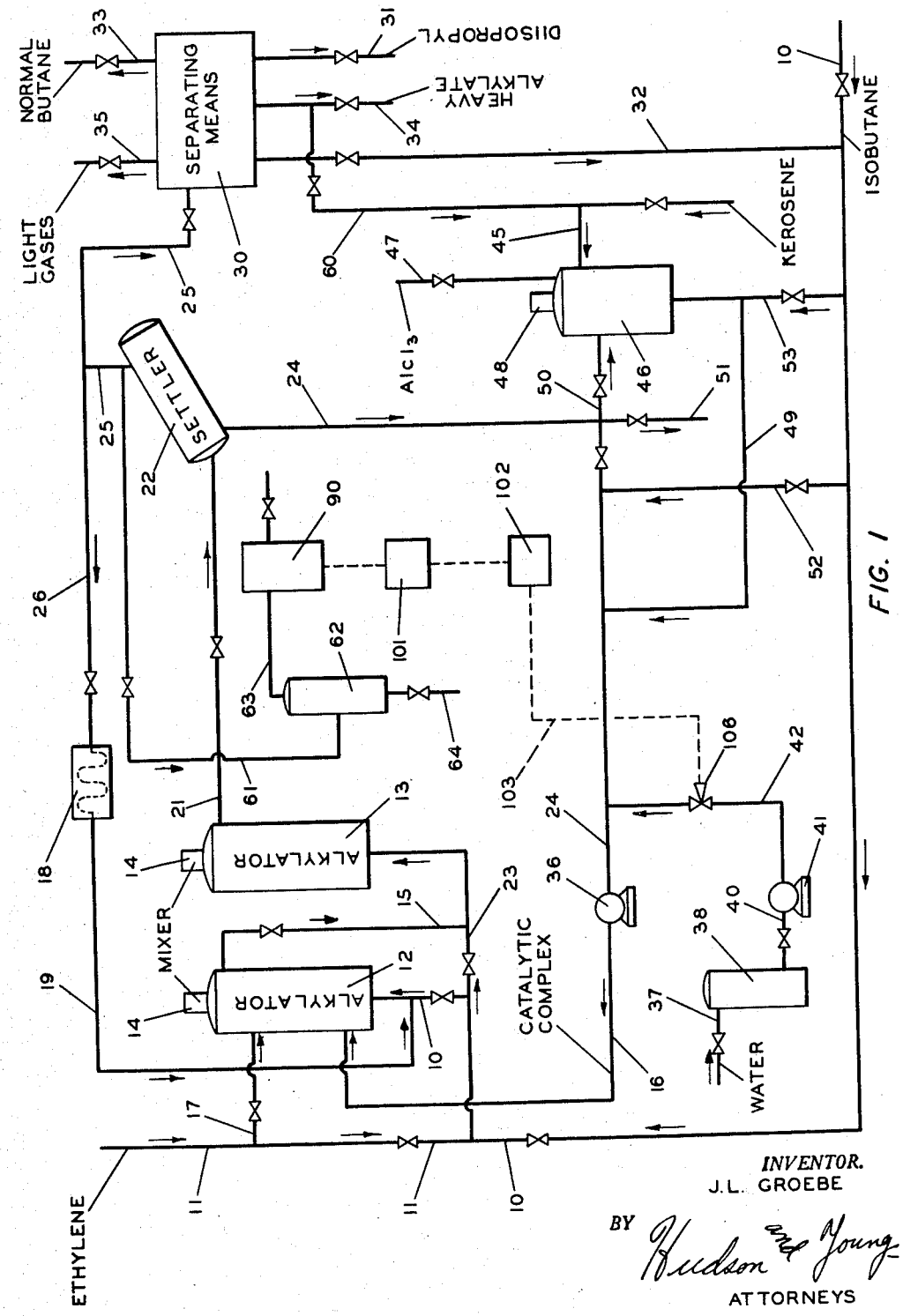

Aug. 8, 1950  J. L. GROEBE  2,518,307
AUTOMATIC CONTROL OF CATALYST PROMOTER
IN A HYDROCARBON CONVERSION PROCESS
Filed Nov. 4, 1946  2 Sheets-Sheet 1

INVENTOR.
J.L. GROEBE
BY Hudson and Young
ATTORNEYS

INVENTOR.
J. L. GROEBE

Patented Aug. 8, 1950

2,518,307

UNITED STATES PATENT OFFICE 2,518,307

AUTOMATIC CONTROL OF CATALYST PROMOTER IN A HYDROCARBON CONVERSION PROCESS

John L. Groebe, Phillips, Tex., assignor to Phillips Petroleum Company, a corporation of Delaware Application November 4, 1946, Serial No. 707,749

9 Claims. (Cl. 260—683.4)

This invention relates to the conversion of organic compounds. One aspect of this invention relates to the conversion of organic compounds in the presence of a catalyst and a promoter. Another aspect of this invention relates to the conversion of hydrocarbons in the presence of an added catalytic promoter, such as the alkylation of isobutane with ethylene to produce diisopropyl in the presence of an aluminum-chloride hydrocarbon complex catalyst promoted by a hydrogen halide.

In the catalytic conversion of organic compounds promoters are often used to increase the yield of products, the life of the catalysts, etc. The conversion of hydrocarbons, such as polymerization, alkylation, hydrogenation, disproportionation and cracking, is frequently effected in the presence of a suitable catalyst. For example, in the alkylation of a low-boiling isoparaffin such as isobutane, aluminum chloride, either supported on active charcoal, activated alumina or aluminus materials such as bauxite, active silica and various clays such as fuller's earth and kieselguhr, or as a separate liquid in the form of a complex with an organic or an inorganic compound or material, is used as a catalyst to convert the isobutane to a hydrocarbon having a different molecular weight. It is often necessary and highly desirable in such a conversion process which uses aluminum chloride as a catalyst to have a small amount of a hydrogen halide present as a promoter, sometimes only from about 0.01 to about 1 or about 5 per cent by weight of the hydrocarbon present in the reaction zone. Successful operation can be maintained with no more than about 0.1 to 1 per cent hydrogen halide present, a concentration which can be adequately maintained with the addition of only about 5 to about 10 pounds of hydrogen halide an hour to a reaction system producing 65,000 to about 75,000 gallons of product per day. Water has also often been added to the reaction system as a promoter when aluminum chloride is used as the catalyst because the water reacts with a small amount of aluminum chloride to liberate hydrogen chloride.

Various alcohols, alkyl halides and organic ammonium compounds are frequently used to promote reactions catalyzed by such catalysts as hydrogen fluoride. Boron trifluoride and titanium tetrafluoride have been used for promoting the alkylation of hydrocarbons in the presence of a hydrofluoric acid catalyst. Hydrides of sulfur tellurium and selenium are also promoters and may be used to promote such reaction as polymerization, desulfurization and dehydrogenation. Still another promoter is ethylene oxide which is frequently used to promote catalytic cracking reactions.

Since these promoters are effective when present only in an optimum concentration in the reaction mixture, careful control of the concentration is required to assure optimum yield of product and prolonged catalyst life. The proper introduction of the promoter into the reaction zone is a definite and vexatious problem. Continuous or at least intermittent injection of the promoter into the conversion process is required in continuous systems. As a result of variation in the feed composition and the inevitable variation in the temperature and pressure of the reaction, the amount of promoter injected into the system must be continually changed to correspond to requirements for a proper yield of product. Such control of the injection of the promoter may be carried out by analyzing the conversion effluent to determine the yield of product and then injecting the amount of promoter required as the result of the conversion effluent analysis. At the present time, such analysis of the conversion effluent and the regulation and control of the promoter to the reaction system are manually operated and controlled. It is much to be desired, therefore, to provide a process and apparatus for the continuous and automatic injection of a promoter into the reaction system in accordance with immediate requirements.

An object of this invention is to provide a process and apparatus for the control of the conversion of organic compounds.

It is another object of this invention to provide apparatus and means for the continuous and automatic injection of a promoter into a system for the catalytic conversion of organic compounds in accordance with the immediate requirements of the system.

A further object of this invention is to provide a process and apparatus for the conversion of isobutane and ethylene to diisopropyl in the presence of a hydrocarbon-aluminum chloride complex promoted by a hydrogen halide.

Another object of this invention is to provide a process and apparatus for injecting a promoter into the reaction system of a process for the conversion of hydrocarbons.

Still another object of this invention is to alkylate alkylatable hydrocarbons.

It is still a further object of this invention to react water continuously and automatically with a liquid hydrocarbon-aluminum chloride catalyst to produce a small controlled amount of hydrogen chloride.

Further objects and advantages of the present invention will become apparent to those skilled in the art from the accompanying description and disclosure.

According to this invention, a fluid promoter is injected into the reaction system of a process for the conversion of organic compounds to a product having a different molecular weight than the reactant or reactants by means photoelectrically responsive to the composition of the conversion effluent. More specifically, a fluid promoter is introduced into the system of a conversion process in a continuous and automatic manner and in the required amount by creating an electrical impulse corresponding to a particular analysis of the conversion effluent, which electrical impulse is created by means of an infra-red analyzer, such as that manufactured by Baird Associates. The conversion effluent is passed in the vapor phase through such an infra-red analyzer and the resulting electrical impulse produced in the photoelectrically responsive portion of the analyzer is picked up and amplified by a suitable amplifying system. The amplified impulse operates a conventional recorder-controller, such as that manufactured by Leeds and Northrup Company or by Brown Instrument Company, which recorder-controller, in turn, operates a pump or a valve or both for the continuous injection of a promoter into the reaction system.

Figure 2:
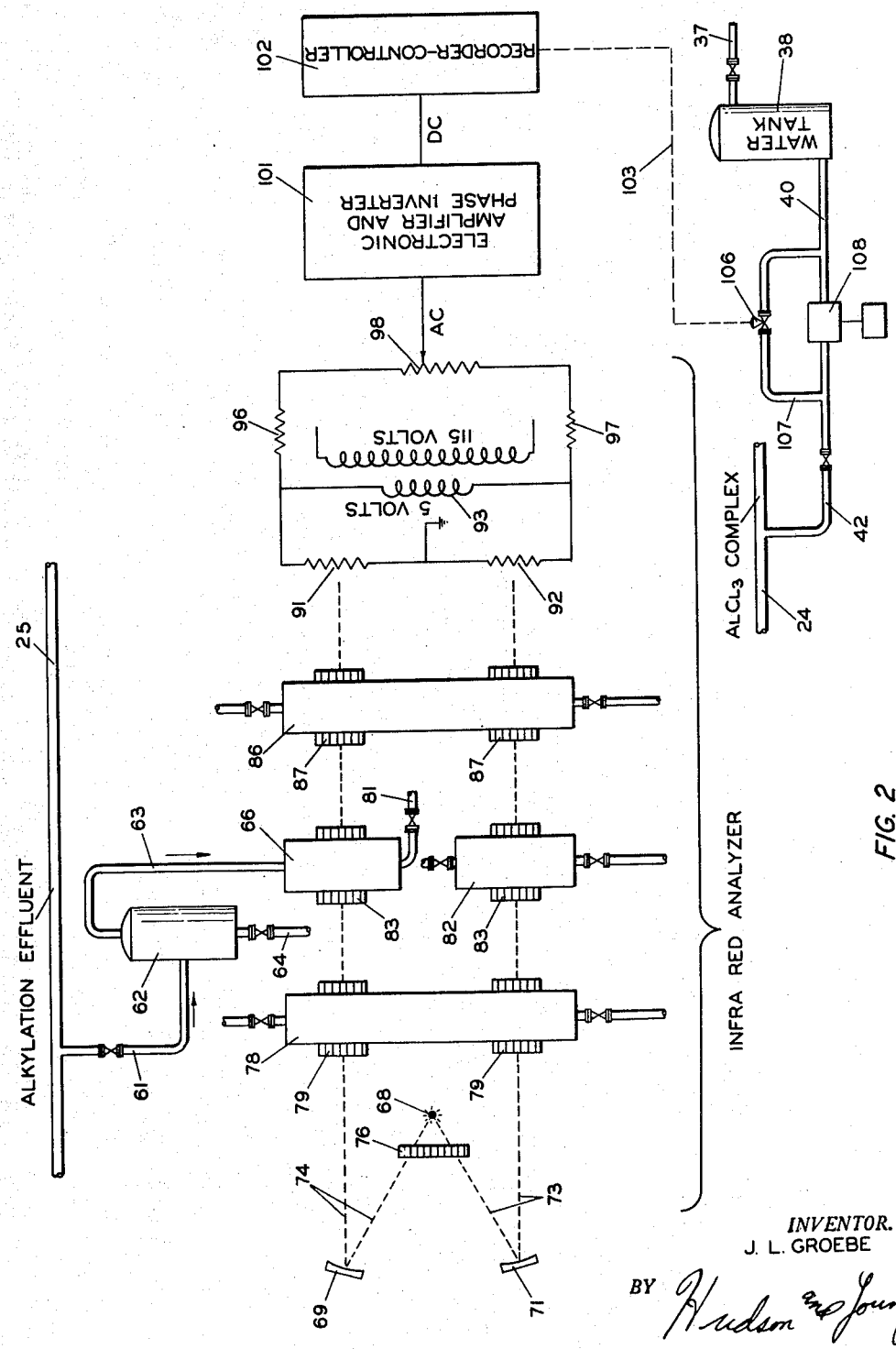

The invention will be described in more detail in connection with the accompanying drawing which shows diagrammatically arrangements of apparatus which can be used in practicing an embodiment of this invention. Figure 1 shows diagrammatically an arrangement of apparatus suitable for the alkylation of an alkylatable hydrocarbon with an olefin hydrocarbon. Figure 2 shows diagrammatically an arrangement of apparatus for the automatic injection of a promoter into such a process as shown in Figure 1. Although the drawings and the description thereof are limited specifically to the alkylation of isobutane with ethylene and to the injection of water in a particular manner to promote the reaction, the description and drawing should not be construed to unnecessarily limit the invention.

Referring to Figure 1, the operation and apparatus will be described in connection with the alkylation of isobutane by reaction with ethylene to produce an alkylate fraction containing primarily the hydrocarbon known as diisopropyl (2,3-dimethylbutane). Isobutane is passed to the process through pipe 10 and an ethylene-containing stream is passed to the process through pipe 11. As will be appreciated by those skilled in the art in commercial operation, each of the streams in pipes 10 and 11 will generally contain appreciable amounts of other hydrocarbons as well and this will apply particularly to the ethylene-containing stream. The ethylene-containing stream will generally include ethane and may also include isobutane since it is often the practice to use liquid isobutane as an absorption liquid to separate an ethylene rich material from effluents of dehydrogenation processes. The alkylation reaction is preferably conducted in two reactors, 12 and 13, each of which is provided with a suitable mixer 14 of which the essential components are a motor and a stirrer within the alkylator. The stirrer is driven by the motor at a speed such that intimate mixing is obtained between the complex catalyst and the hydrocarbon reaction mixture, which in this instance is primarily in the liquid phase, although vapor phase operation is broadly within the scope of this invention.

The two alkylators, 12 and 13, are connected by a pipe 15 so that they operate in series as substantially a single alkylation zone. Ethylene introduced through pipe 11 is admixed with isobutane introduced through pipe 10 and a desired portion thereof enters the bottom of alkylator 12. A liquid hydrocarbon-aluminum chloride complex is introduced near the bottom of alkylator 12 through pipe 16. If desired, a portion of the ethylene stream may also be added to the mixture in alkylator 12 through pipe 17 near the top of the alkylator. The reaction temperature should be between about 110 and about 120° F. and the pressure should be sufficient to maintain the hydrocarbon in the liquid phase, which in this instance will be between about 400 and about 420 pounds per square inch gage. The ratio of isobutane to ethylene in the combined feed should be at least about 2:1 and, while it may be as high as 10:1 or more, satisfactory operation will generally be obtained at a ratio of about 3:1 provided a sufficient amount of recirculation of reaction mixture is used.

A reaction mixture in alkylator 12 passes from the top thereof through pipe 15 to the bottom of alkylator 13. If desired, an additional quantity of an isobutane-ethylene mixture may be added through pipe 23 to the reaction mixture just before it enters alkylator 13. A reaction effluent from alkylator 13 is removed therefrom and passed through pipe 21 to a settler 22. In order to control the amount of promoter in alkylators 12 and 13, a portion of the effluent in line 25 is continuously withdrawn therefrom and passed through pipe 61 to a flash chamber 62, in which chamber at least a portion of the liquid effluent is vaporized under conditions of constant temperature and constant pressure. A liquid bottom fraction is removed from flash chamber 62 through pipe 64 and a vapor overhead fraction is removed from chamber 62 through pipe 63. This vapor fraction is continuously passed through pipe 63 and through an infra-red analyzer 90. In some instances it may be desirable to vaporize all of the effluent passing through pipe 61 to chamber 62. In such instances, no liquid will be withdrawn from flash chamber 62 through pipe 64. Infra-red analyzer 90 creates an electrical impulse corresponding to the composition of the vaporous stream passing therethrough, which impulse is amplified by a conventional amplifier 101 and the amplified impulse is passed to a conventional recorder-controller 102. Usually amplifier 101 also comprises a phase inverter to change the alternating current created in the infra-red analyzer 90 to a direct current. Conditions of temperature and pressure in vaporizer or flash chamber 62 are maintained constant so that the composition of the overhead vapor will vary only with the composition of the effluent in pipe 25 and will not vary because of variations in temperature and pressure in chamber 62. Usually chamber 62 is maintained at atmospheric pressure and at a temperature of about 100° F. Recorder-controller 102, electrically or pneumatically, operates a valve 106 by means of transmission means 103. Valve 106 controls the injection, usually continuous, of water into pipe 24, which water is introduced into a water storage tank 38 through pipe 37 and is passed through pipe 40, a pump 41, pipe 42 to pipe 24. A hydrocarbon-aluminum chloride complex catalyst is being recycled through pipe 24 to alkylator 12 by means of a pump 36 and pipe 16. Upon the introduction of water from pipe 42 into pipe 24, hydrogen chloride is liberated from the aluminum chloride complex and serves as a promoter for the alkylation reaction. Valve 106 is set such that the optimum amount of hydrogen chloride is liberated by the water in pipe 24 in response to the composition of the effluent flowing from alkylator 13 through pipe 25. The mechanical and electrical features for the operation of valve 106 in response to the composition of the effluent in pipe 25 will be more fully described hereinafter with regard to Figure 2.

Settler 22 is preferably an elongated receptacle set on a slope with a solid baffle plate (not shown) near the inlet and extending about half up in the settler. Such a baffle plate serves to distribute the incoming emulsion across the receptacle section thereby tending to reduce any short-circuiting effect and also serving as a retainer wall for the liquid catalyst which settles out. The liquid complex catalyst which settles out is removed from settler 22 through pipe 24 and the hydrocarbon material substantially free from catalyst is passed from settler 22 to pipe 25. A substantial portion of this hydrocarbon material is passed from pipe 25 through pipe 26 to a cooler 18 where it is cooled to an extent sufficient to compensate for the heat of reaction generated in alkylators 12 and 13 and to maintain a desired reaction temperature therein. This portion of the hydrocarbon material is then recycled by means of pipe 19 to pipe 10 of alkylator 12.

The other part of the hydrocarbon material is passed through pipe 25 to a separating means 30. Generally, it will be desirable to wash the hydrocarbon material with an alkaline solution to remove any acidic materials which may be present before the material is subjected to fractional distillation. Separating means 30 will comprise necessary equipment for such a washing and suitable fractional distillation equipment such as is common in such alkylation plants. A diisopropyl fraction is separated and removed from separating means through pipe 31 as a product of the process. Unreacted isobutane is recovered and removed from separating means 30 through pipe 32 and returned to the process by being introduced into pipe 10. Normal butane, which will include that initially accompanying the charge stock and any normal butane formed by isomerization during the alkylation process, may be separated and discharged through pipe 33. One or more of the alkylate fractions may also be recovered through pipe 34. Undesired light gases are discharged through pipe 35.

The liquid hydrocarbon-aluminum chloride complex catalyst which settles from the effluents of the alkylation zone is passed from a low point of settler 22 through pipe 24 and pump 36 and then through pipe 16 back to alkylation zone 12. To this recycled liquid complex catalyst, water is added in small continuous and controlled known quantities, preferably just before the intake of pump 36. This can be accomplished as previously described by introducing water through pipe 37 to tank 38. The water is withdrawn therefrom through pipe 40, passed through pump 41 and pipe 42 and introduced into pipe 24 into the catalyst passing therethrough by a nozzle (not shown) extending inside pipe 24, approximately to the center line. In many instances, pump 41 will be a centrifugal pump and valve 106 will be suitable for regulating the flow of water through pipe 42.

In making the original batch of catalyst, kerosene or other suitable hydrocarbon material may be added through pipe 45 to catalyst preparation vessel 46. Aluminum halide or other Friedel-Crafts metal halide catalysts, such as aluminum chloride, is added to vessel 46 through line 47. These materials are intimately mixed by means of a mixer 48 in vessel 46. The resulting liquid hydrocarbon-aluminum chloride complex is introduced into the alkylation system through pipe 49 and pipe 24. After the process has been started the activity of the recycled catalyst may be maintained by refortifying it by passing a portion of this recycled catalyst through pipe 50 to vessel 46 wherein aluminum chloride either as such or as an aluminum chloride complex may be intimately mixed with it. If it is desired to add an aluminum chloride complex, such may be formed by passing heavy hydrocarbons from pipe 34 through pipe 60 to pipe 45 into catalyst preparation vessel 46. Since such a treatment tends to increase the total volume of catalyst available, it will generally be found necessary to maintain the desired volume of catalyst by withdrawing material from the system through pipe 24 and pipe 51. It has been found that the viscosity of the catalyst can be more easily maintained at a low value by having the catalyst admixed with an appreciable amount of alkylatable hydrocarbons in the absence of an olefin outside the reaction zone. To this end isobutane may be added to the catalyst in pipe 24 by being passed from pipe 10 through pipe 52. In case it is desired to mix the catalyst passing through pipe 49 with isobutane, this is accomplished by passing isobutane from pipe 10 through pipe 53 to pipe 49.

In many instances it may be desirable to inject hydrogen chloride or other hydrogen halide into pipe 24 instead of injecting water therein. In such modifications, pipe 42 and valve 106 will be operated to control the amount of hydrogen chloride introduced into pipe 24. Hydrogen chloride or other promoter may also be introduced directly (not shown) into the alkylator 12 and valve 106 will thus control the injection of hydrogen chloride directly into the alkylator without departing from the scope of this invention. It is also possible that valve 106 may constitute a series of valves for the multiple point injection of a promoter into the reaction zone. Other similar modifications may be practiced without departing from the scope of this invention.

Aluminum chloride is the Friedel-Crafts metal halide catalyst which will most generally be used in the practice of this invention when applied to the process described in Figure 1. Within the broad concept of this invention, aluminum bromide and aluminum fluoride may also be used as the catalyst. While aluminum fluoride generally does not give satisfactory results, mixed halides, such as $AlCl_2F$, $AlClF_2$, $AlBr_2F$, and the like, may also be used successfully. Liquid hydrocarbon-aluminum halide catalyst is generally prepared by reacting a relatively pure and substantially anhydrous aluminum halide with a paraffin hydrocarbon or a paraffin hydrocarbon fraction at a temperature between about 150 and about 230° F. It is often desirable to effect the production of the catalyst in the presence of a small amount of a hydrogen halide which may be added during its formation. The hydrocarbon and aluminum chloride are vigorously mixed until a resulting complex contains in combination from about 40 to about 70 weight per cent of aluminum halide. Satisfactory fluid complexes have been prepared from a variety of paraffin hydrocarbons, including normal heptane, isooctane, a paraffinic alkylate fraction resulting from a reaction of isobutane with butylene and boiling above 350° F., and olefinic polymer fraction boiling in the upper part of the gasoline range and kerosene. An essential requirement in the preparation of a good catalyst complex appears to be the use of a sufficiently vigorous mixing to maintain aluminum halide and hydrocarbon in intimate contact during the period the catalyst is being prepared. Two general types of catalyst have been prepared. These are characterized as high-aluminum halide and low-aluminum halide types. When preparing a catalyst with aluminum halide, the high aluminum chloride type contains 80 to 85 per cent by weight of aluminum chloride. The low aluminum chloride type contains about 55 per cent by weight of aluminum chloride. The high aluminum chloride type can be added during continuous runs in small amounts to the recirculating catalyst in order to maintain catalyst activity. In most operations the activity of the catalyst can generally be adequately maintained, as to its aluminum halide content, by mixing aluminum halide directly with a suitable portion of recycled catalyst complex.

The regulation and control of the introduction of the promoter to the conversion zone of such a system as described in Figure 1 will now be described more fully with reference to Figure 2 of the drawings. A conversion effluent passing through pipe 25, such as the alkylation effluent of the process described in Figure 1, is divided into two streams, usually the larger portion is passed to separating means 30 of Figure 1 and a minor portion is passed through pipe 61 to a flash chamber 62. In flash chamber 62 a liquid effluent is at least partially vaporized under constant conditions of temperature and pressure and vapor is passed from vessel 62 through pipe 63 and through analysis chamber 66 of an infra-red analyzer. Liquid may be withdrawn from flash chamber 62 through line 64. It is important that the condition of temperature and pressure of flash vessel 62 be maintained constant in order that the composition of the overhead in pipe 63 will not depend upon the conditions existing in vessel 62 but will depend primarily upon the composition of the alkylation effluent in line 25. In some instances the entire portion of the effluent passing through line 61 may be vaporized in flash chamber 62. When the entire effluent is vaporized, constant conditions of temperature and pressure in flash chamber 62 are not so important because the composition in line 63 cannot change because of variations in temperature and pressure in vessel 62. Also, vaporizer 62 may be omitted and a liquid may be passed directly from pipe 25 to analysis chamber 66, or, when the material in pipe 25 or a similar effluent conduit is a vapor, vapor may be passed directly to chamber 66. Of course, when the effluent in pipe 21 does not include the catalyst, such as when using a solid catalyst in situ, pipe 61 may be connected directly to pipe 21 instead of pipe 25.

The number of chambers and their positions in the infrared analyzer as shown are typical of triple-cell units designed for the analysis of gaseous or liquid materials. Such units may be purchased on the market and may be connected up in the manner herein described. In the preferred embodiment of this invention, chambers 78 and 86 of a typical triple-cell unit infra-red analyzer are not used. Chamber 66 has a continuous stream of material to be analyzed passing therethrough and out through line 81. Chamber 82 is filled with a standard sample of a gaseous mixture (or liquid as the case may be) of hydrocarbons of the composition according to the optimum yield of product, such as the optimum composition of the alkylation effluent passing through line 21 of Figure 1.

According to Figure 2, light source 68 is a nickel-chromium wire which glows at about a dull red heat. Light rays from source 68 may pass through a quartz window 76, if desired, for the purpose of removing interfering rays of light. Window 76 is optional and is unnecessary in many applications of the instrument. After passing through quartz window 76, the light is deflected on concave focal mirrors 69 and 71 along paths 74 and 73, respectively. In this manner, two light paths for passing through chambers 66 and 82 are formed. As previously discussed, chamber 82 contains a sample of the optimum composition of the effluent in line 21. Chamber 66 contains a continuous stream of the effluent in line 21. In one type instrument, such as the Baird Associate Instrument, the sample chambers are constructed of brass and silver plated both inside and out. The windows 83, through which a light beam enters and leaves the chamber, are formed from sodium chloride. However, calcium chloride has been used in other instruments.

In the application of the present invention to the process described in Figure 1, the ethylene content of the alkylation effluent is of primary importance and it is the composition of the ethylene in the alkylation effluent which is affected by the promotor. Therefore, the overhead from flash chamber 62 will comprise ethylene along with other low-boiling hydrocarbons. Where the alkylation is of isobutane with ethylene, a typical or optimum alkylation effluent corresponding to this type of alkylation and to the particular feed composition used, is scrubbed with sulfuric acid to remove the ethylene therefrom and the remaining hydrocarbons are placed in chamber 82 as a standard sample for the infra-red analyzer. In the event operating conditions on the alkylation units are changed, such as an increase or decrease in the paraffin to olefin ratio, it may be necessary to provide a new control sample representative of the effluent for chamber 82. Such a procedure may be necessary in order to maintain the proper base or zero line on the instrument because the changes in the percentages of the various normal paraffins will affect the light transmission. The light beams passing through chambers 66 and 82 are focused on bolometers 91 and 92. A bolometer is a resistance thermometer formed by wrapping wire, such as platinum or nickel wire, around a strip of mica and coating the whole assembly with platinum black. The entire bolometer mechanism actually consists of two such resistance thermometers 91 and 92 which receive the light transmitted through sample chamber 66 and reference chamber 82, respectively. The temperature difference between 91 and 92 is in the order of about 0.1° C. Resistance thermometers 91 and 92 comprise two arms of an alternating current bridge. This bridge is supplied with a low alternating current of about four to five volts by transformer 93. Resistances 96 and 97 comprise the other two arms of the bridge. In operation, that is with the unknown sample in chamber 66 and the standard sample in chamber 82, the unbalance of the alternating current bridge caused by the difference in light intensity on the two resistance thermometers 91 and 92 causes an electrical impulse of a certain magnitude to flow which is picked up at point 98 and is transmitted by suitable means to the grid of an input tube of a conventional electronic amplifier 101. The light intensity on bolometers 91 and 92 decrease their resistance to the flow of current therethrough.

The electronic amplifier of 101 may comprise a single or a series of vacuum tubes having an anode and cathode circuit. Incorporated as a part of electronic amplifier 101 is also a phase inverter to convert the alternating current from 98 to a direct current signal which drives conventional recorder-controller 102. The phase inverter may conveniently comprise an electron discharge rectifying tube having an anode-cathode circuit. Various conventional methods known to those skilled in the art may be used for connecting the electronic amplifier 101 to the output from the infra-red analyzer and for connecting the recorder-controller 102 to the electron amplifier 101. In the particular case shown in Figure 2, a single wire is connected between adjustable resistance 98 and the grid of the input tube of amplifier 101 and since both transformer 93 and the input tube of amplifier 101 are grounded (not shown) the circuit is complete. The alternating current signal from the resistance bridge or output 98 of the infra-red analyzer is of a very low E. M. F. and must be amplified by electronic amplifier 101 to the order of about 10 to about 20 millivolts, which is sufficient to drive conventional recording controlling instruments such as the Brown Electronic Recorder-Controller or the Leeds and Northrup Micromax. The output of amplifier 101 is connected to the thermocouple input connection on the recording-controlling instrument by two wires, such as from the anode and cathode of the output tube which acts in a similar manner as a thermocouple. A suitable resistance may be interposed between amplifier 101 and recorder-controller 102, if necessary. It is usually necessary to calibrate the strip chart on the recorder-controller to ascertain the so-called zero or base line near the center of the chart scale. The sensitivity of the instrument is then adjusted so that a given departure of an inch or so on the chart above or below the base line produces the desired magnitude of control effect. Valve 106 on line 107 is responsive through transmission means 103 to controller 102. Transmission means 103 may comprise either electric or pneumatic means. In case of pneumatic transmission a cam is placed on the shaft of the slide wire disc of controller 102 which cam regulates the air supply through a pilot valve to valve 106. A typical hook-up between a Micromax controller and an automatic valve on a pipe and one which is suitable for the present invention is shown in detail in Folio N-OOB of the Leeds and Northrup Company.

Water is introduced into water tank 38 through pipe 37 and flows therefrom through pipe 40 and constant displacement pump 108 and pipe 42 into aluminum chloride complex pipe 24 of Figure 1. Valve 106 regulates the flow of water through by-pass line 107; thus, regulating the flow of water into aluminum chloride complex line 24. Valve 106 cannot be placed directly on pipe 42 since pump 108, as shown in Figure 2, is a positive displacement pump. The regulation of the amount of water passing through pipe 42 is accomplished by regulating the amount of water by-passed through pipe 107.

The injection of water into the aluminum chloride catalyst generates hydrogen chloride which controls the activity of the catalyst. In the diagram of Figure 1 the control of the activity of the catalyst is maintained so that the conversion of the ethylene is about 95 to 97 per cent. Lower conversions on the order of 90 to 92 per cent are known to produce a somewhat higher per cent of diisopropyl in the alkylate but generally the higher conversion of 95 per cent or more has proven to be most economical for this particular type alkylate desired. Thus, when the conversion of ethylene has decreased below a selected level, such as 95 per cent conversion, and the ethylene in the effluent increases, the infra-red analyzer picks up the change of ethylene content of the effluent as an electrical impulse of such magnitude that valve 106 is opened more widely to allow an increased amount of water to flow into line 24. The increased amount of water liberates an increased amount of hydrogen chloride which increases the conversion of ethylene. When the conversion is too high the reverse process is effected and valve 106 is closed to decrease the amount of water in line 24.

The number of chambers in the infra-red analyzer, such as chamber 78 and chamber 86 is dependent upon the specific application of the infra-red analyzer, that is the number of interfering hydrocarbon components in the stream which is to be analyzed. In some instances, chamber 78 will contain the unknown sample while chambers 66, 82 and 86 may be filled with some specific hydrocarbon which would absorb interfering light wave lengths resulting in the intensification of the wave lengths of the desired components. Chambers 78 and 86 have windows 79 and 87, respectively, for the transmission of the light rays therethrough. As previously discussed, the arrangement of the chambers and the components placed in these chambers may be varied without departing from the scope of this invention.

*Example*

As an example of the operation of my invention, an isobutane feed stock is charged to an apparatus such as is illustrated in Figure 1, through pipe 10. This stream has a composition such as is shown in the accompanying table, and is charged in a continuous stream in an amount averaging about that indicated. An isobutane-ethylene mixture is prepared by using a liquid isobutane stream, from the same source as the isobutane feed, as an absorption liquid in a demethanizer to which is charged, as a gas, an effluent stream from a process for converting an ethane-propane mixture to ethylene. This isobutane-ethylene mixture has a composition as shown in the table and is charged in about the amount shown, through pipe 11. The reaction temperature ranges up to about 140° F. as a maximum, with a preferred range between 100 and 110° F., and the volume of cooled recycle passed through cooler 18 and pipe 19 is such that the overall temperature rise is not more than about 15 to 20° F. Under these conditions liquid phase operation is assured with a pressure not greater than about 400–420 pounds per square inch gage.

| | Isobutane Feed, Pipe 10 | Isobutane-Ethylene Pipe 11 | Net Effluent Pipe 25 | Recycle Pipe 26 |
|---|---|---|---|---|
| Barrels/day | 1,500 | 3,440 | 1,680 | 164,000 |
| Composition, Mol. Per Cent: | | | | |
| Methane and Lighter | | | 7.60 | 2.98 |
| Ethylene | | | 21.98 | .76 |
| Ethane | | | 16.11 | 6.95 |
| Propylene | | | 6.69 | 0.0 |
| Propane | | 5.6 | 8.76 | 10.81 |
| Isobutane | | 87.1 | 36.50 | 56.90 |
| N. Butane | | 7.3 | 2.36 | 2.10 |
| Iso Hexanes | | | | 12.10 |
| Other C5+ | | | | 7.40 |
| | | 100.0 | 100.0 | 100.0 |

The effluent is passed through pipe 21 to settler 22, and catalyst-free hydrocarbon is divided into two portions as shown in the table. The catalyst, in an amount between about 91,500 and 97,000 barrels per day, is separated and the major portion is returned. To this is added, during normal operation, about 0.6 gallon of water per hour, through pipe 42. This water is successfully added continuously by automatic injection into line 24 of the exact amounts of water at any particular time as the result of the infra-red analysis of the effluent and pneumatic operation of flow valve 106 responsive to recorder-controller 102. In addition, aluminum chloride is added to the recirculated catalyst by withdrawing a side-stream through pipe 50 of about 5 gallons per minute. Aluminum chloride is added, normally, through pipe 47 at about 145 to 230 pounds per hour, and intimately admixed in tank 46 with this withdrawn catalyst portion, and the refortified catalyst is returned to the reaction system through pipe 49. Under these conditions the amount of HCl is maintained at a definite, desired low value and the viscosity of the catalyst is maintained at less than 200 centistokes at 100° F.

I claim:

1. In a process for the alkylation of an alkylatable hydrocarbon with an olefin in the presence of an alkylation catalyst which is promoted by the presence of a minor amount of a hydrogen halide in the reaction mixture, the method for continuously controlling the extent of alkylation which comprises passing infrared light rays through the alkylation effluent under conditions such that an electrical impulse is produced corresponding in magnitude to the concentration of unreacted olefin in said effluent and automatically controlling the amount of hydrogen halide present in said reaction mixture in response to the magnitude of said electrical impulse.

2. In a process for the alkylation of isobutane with ethylene in the presence of an aluminum chloride-containing catalyst which is promoted by injecting a minor amount of hydrogen chloride into the alkylation zone and in which the ratio of isobutane to ethylene in the feed is between about 2:1 and about 10:1, the method for continuously controlling the extent of alkylation which comprises passing infrared light rays through the alkylation effluent under conditions such that an electrical impulse is produced corresponding to the concentration of ethylene in said effluent and automatically controlling the amount of hydrogen chloride injected into said alkylation zone in response to said electrical impulse; said hydrogen chloride being injected in increased amounts when the ethylene content of said effluent is above a pre-determined amount and said hydrogen chloride being injected in decreased amounts when the ethylene content of said effluent is below a pre-determined amount.

3. In a process for the alkylation of isobutane with ethylene in the presence of an aluminum chloride-containing catalyst which is promoted by injecting a minor amount of a hydrogen halide into the alkylation zone and in which the ratio of isobutane to ethylene in the feed is between about 2:1 and about 10:1, the method for continuously controlling the extent of alkylation which comprises passing infrared light rays through the alkylation effluent under conditions such that an electrical impulse is produced corresponding to the concentration of ethylene in said effluent and automatically controlling the amount of hydrogen halide injected into said alkylation zone in response to said electrical impulse so as to maintain a conversion of ethylene of from about 90 to about 97 per cent.

4. The process of claim 2 in which the concentration of ethylene in said alkylation effluent is maintained between about 3 and about 10 per cent of the ethylene introduced as feed to the alkylation zone.

5. The process of claim 2 in which the hydrogen halide is introduced into said alkylation zone by introduction of water with said catalyst.

6. In an alkylation process comprising reacting a mixture comprising isobutane and ethylene in a molar ratio of between about 2 to 1 and about 10 to 1 in an alkylation zone under alkylation conditions in the presence of an aluminum chloride-containing catalyst refortified during alkylation and promoted with hydrogen chloride wherein the catalyst activity and alkylating efficiency thereof are dependent upon the concentration of hydrogen chloride in said alkylation zone, the method of continuously maintaining the ethylene concentration in the alkylation effluent between about 3 and about 5 per cent of the ethylene in said reaction mixture, which comprises passing infrared rays through at least a portion of said alkylation effluent under conditions such that an electrical impulse is produced corresponding in intensity to the concentration of ethylene in said effluent and automatically regulating the concentration of hydrogen chloride in said alkylation zone in response to variations in intensity of said electrical impulse so as to maintain said ethylene concentration.

7. The process of claim 6 wherein the hydrogen chloride concentration in the alkylation zone is regulated by the controlled introduction of water to the catalyst-reaction mixture.

8. An alkylation system for the alkylation of an alkylatable hydrocarbon with an olefin in the presence of an aluminum halide-containing catalyst promoted with a fluid promoter and simultaneously controlling the extent of alkylation by automatically regulating the concentration of said promoter in the alkylation zone in response to variations in the concentration of olefin in the alkylation effluent, comprising in combination an alkylation chamber having a feed inlet conduit communicating with said chamber, a catalyst inlet conduit communicating with said chamber, and an effluent conduit communicating with said chamber; a fluid promoter feed line communicating with said chamber; a flash chamber for the volatilization of at least a portion of the effluent from said alkylation chamber; an infra-red analyzer adapted so as to create an electrical impulse corresponding in magnitude to the concentration of said olefin in the effluent in said effluent conduit; an electronic amplifying system adapted so as to amplify the electric impulse from said infra-red analyzer; a recorder-controller; an automatic flow control valve positioned in said fluid promoter line; conduit means communicating between said alkylation chamber and said flash chamber; conduit means for passing vapor from said flash chamber to said infra-red analyzer; means for transmitting the amplified impulse from said amplification system to said recorder-controller; and transmission means communicating between said recorder-controller and said control valve for automatically operating said valve in response to the magnitude of the electric impulses created in said infra-red analyzer.

9. An alkylation system for alkylation of an alkylatable hydrocarbon with an olefin in the presence of an aluminum halide-containing catalyst promoted with a fluid promoter and simultaneously controlling the extent of alkylation by automatically regulating the concentration of said promoter in the alkylation zone in response to variations in the concentration of olefin in the alkylation effluent, comprising in combination an alkylation chamber having a feed inlet line, a fluid promoter inlet line, a catalyst inlet line, and an effluent line; a flow control valve in said promoter line for regulating flow of promoter therein; and means for actuating said flow control valve comprising an infra-red light source, light transmission means in communication with said effluent line and adapted for passage of light from said light source therethrough, an electrically energized element positioned so as to receive light from said transmission means and in actuating communication with said control valve.

JOHN L. GROEBE.

REFERENCES CITED

The following references are of record in the file of this patent:

UNITED STATES PATENTS

| Number | Name | Date |
|---|---|---|
| 2,386,830 | Wright | Oct. 16, 1945 |
| 2,402,126 | Clarke | June 18, 1946 |
| 2,406,709 | Pevere | Aug. 27, 1946 |
| 2,409,544 | Clarke | Oct. 15, 1946 |